(12) United States Patent
Li (10) Patent No.: US 7,983,280 B2
(45) Date of Patent: Jul. 19, 2011

(54) METHOD AND SYSTEM FOR DISTRIBUTING SESSION KEY ACROSS GATEKEEPER ZONES IN A DIRECT-ROUTING MODE

(75) Inventor: Kun Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 1156 days.

(21) Appl. No.: 11/648,924

(22) Filed: Jan. 3, 2007

(65) Prior Publication Data
US 2007/0168527 A1   Jul. 19, 2007

Related U.S. Application Data

(63) Continuation of application No. PCT/CN2006/000168, filed on Jan. 26, 2006.

(30) Foreign Application Priority Data

Feb. 4, 2005 (CN) .......................... 2005 1 0005397

(51) Int. Cl.
  *H04L 12/28* (2006.01)
  *H04J 3/22* (2006.01)
(52) U.S. Cl. ......... 370/401; 370/463; 370/465; 709/228
(58) Field of Classification Search .................. 370/400, 370/401, 431, 463–468; 709/227–230
See application file for complete search history.

(56) References Cited

U.S. PATENT DOCUMENTS

| | | | |
|---|---|---|---|
| 6,247,129 B1 * | 6/2001 | Keathley et al. | 713/156 |
| 6,681,017 B1 * | 1/2004 | Matias et al. | 380/277 |
| 6,775,253 B1 * | 8/2004 | Agrawal et al. | 370/329 |
| 6,775,255 B1 * | 8/2004 | Roy | 370/331 |
| 6,996,716 B1 * | 2/2006 | Hsu | 709/238 |
| 2004/0243815 A1 | 12/2004 | Tsukamura | |
| 2005/0008153 A1 | 1/2005 | Barton et al. | |

OTHER PUBLICATIONS

International Search Report for PCT/CN2006/000168, dated Jun. 5, 2006.
Euchner et al., "Draft New Recommendation H.235.4," ITU-T Draft Study Period 2005-2008, International Telecommunication Union, pp. 1-22 (2004).
Li et al., "Proposed Method of Generating a Share Secret Key Between the Caller and the Callee in Multiple Administration Domains," ITU-T Draft Study Period 2005-2008, International Telecommunication Union, pp. 1-12 (2004).
Supplementary European Search Report for Application No. 06705589, dated Jan. 11, 2008.

* cited by examiner

*Primary Examiner* — Kerri M Rose (57) ABSTRACT

A method for distributing a session key across GateKeeper (GK) zones in a direct-routing mode, including the following steps: a caller's GK and a callee's GK determine a session key distributing mode for a caller and a callee to distribute the session key according to information contained in a received message and pre-configured rules for selecting the session key distribution mode. An embodiment of the present invention also provides a system for distributing a session key across GK zones in a direct-routing mode. The method and the system make it possible for the caller's GK and the callee's GK to select the session key distribution mode, and improves the flexibility of the session key distribution for the GKs.

31 Claims, 4 Drawing Sheets

METHOD AND SYSTEM FOR DISTRIBUTING SESSION KEY ACROSS GATEKEEPER ZONES IN A DIRECT-ROUTING MODE

CROSS-REFERENCES TO RELATED APPLICATIONS

This is a continuation of International Application No. PCT/CN2006/000168, which was filed on Jan. 26, 2006, and which, in turn, claimed the benefit of Chinese Patent Application No. 200510005397.4, which was filed on Feb. 4, 2005, the entire disclosures of which are hereby incorporated herein by reference.

BACKGROUND OF THE DISCLOSURE

1. Field of the Invention

The present invention relates to authentication technologies between a caller and a callee in a direct-routing mode in a communication system, particularly to a method and a system for distributing a session key across Gatekeeper (GK) zones in a direct-routing mode.

2. Background of the Invention

An H.323 system is implemented by a Packet Based Network (PBN) without guarantee on Quality of Service (QoS). Due to its own technical limitation, the PBN is unable to offer QoS or secure services. Therefore in the H.323 system, how to provide real-time and secure services is a problem to be solved.

Versions prior to H.235 protocol V.3 describe some technical solutions on authentication and encryption for the H.323 system, but all of the technical solutions are based on a GK-routing mode. ANNEX I of the H.235 V.3 provides a security solution based on the direct-routing mode, which mainly utilizes the basic features of ANNEX D and ANNEX F of the H.235 V.3 to offer secure service for the communication in the H.323 system, but the implementation of the solution is limited in one GK zone.

Figure 1:
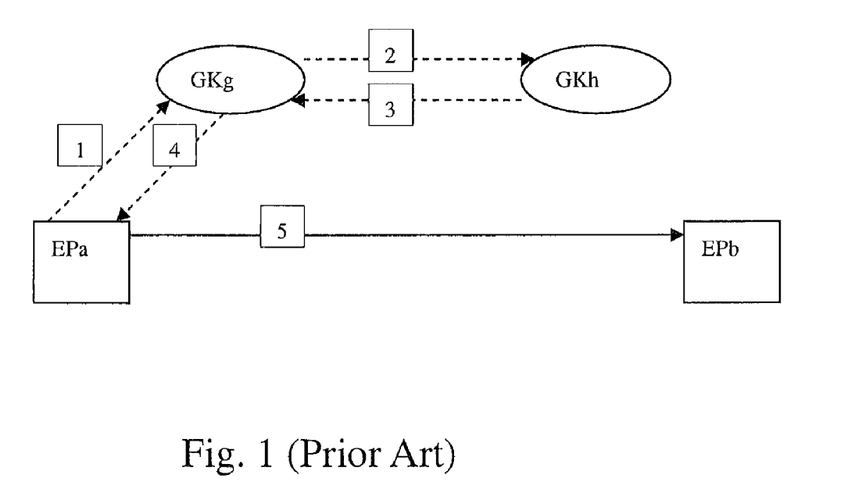
FIG. 1 is a block diagram illustrating a logical network structure of an H.323 system with two GKs.

In a practical network scenario, an H.323 system usually includes two or more GKs. FIG. 1 is a block diagram illustrating a logical network structure of an H.323 system with two GKs.

As shown in FIG. 1, broken lines denote transmission paths of Registration, Admission and Status (RAS) messages described in the H.225 in the GK-routing mode; real lines denote transmission paths of Q.931 messages in the H.225 in the direct-routing mode. EndPoint a (EPa) and EPb are two H.323 EPs, GKg and GKh are two GKs. Wherein, the GKg is the GK of the calling EPa, and the GKh is the GK of the called EPb.

When the H.323 system includes two or more GKs, a pre-call appointment mechanism is usually employed to make the calling EPa and the GKg have a shared key Kag, the called EPb and the GKh have another shared key Kbh, and the GKg and the GKh have yet another shared key Kgh, so as to ensure the reliable transmission of the RAS messages.

If the calling EPa calls the called EPb in the direct-routing mode, reliable transmission of the RAS messages is required by both EPs to acquire a session key Kab, which guarantees the reliable direct transmission of the Q.931 messages in the H.225 between the calling EPa and the called EPb.

In the prior art, there are two methods for the calling EPa and the called EPb to carry out an authentication with the session key Kab when directly transmitting the Q.931 messages in the H.225.

Method 1: the GKh generates the session key Kab, the calling EPa and the called EPb carry out an authentication with the session key Kab generated by the GKh when transmitting the Q.931 messages in the H.225.

A detailed description of this method is given below:

As shown in FIG. 1, the calling EPa sends an Admission Request (ARQ) to the GKg, the request contains a ClearToken with a tokenOID filed set to "I0", indicating that the calling EPa is capable of supporting the ANNEX I of the H.235 V.3, in other words, the calling EPa supports the RAS message transmission in GK-routing mode.

After receiving the ARQ message from the calling EPa, the GKg determines the information of the called EPb based on the value of a destinationInfo field or a destCallSignalAddress field in the ARQ message, and determines that the called EPb is not in the zone of the GKg based on the information of the called EPb. So the GKg sends a Location Request (LRQ) to the GKh, locating the called EPb. An endpointIdentifier field in the LRQ message can convey an Identifier (ID) of the calling EPa, indicating that it is the calling EPa that locate the called EPb.

When the GKg receives the ARQ message and finds out that the value of the tokenOID field of the ClearToken in the ARQ message is "I0", it determines that the calling EPa is capable of supporting the ANNEX I of the H.235 V.3 and then generates a ClearToken with tokenOID set to "I0" in the LRQ message. If the GKg does not support the ANNEX I of the H.235 V.3, the GKg needs not to create the ClearToken with tokenOID set to "I0" in the LRQ message, and the subsequent information exchange process of the LRQ message is performed in a normal way as that when the ANNEX I of the H.235 V.3 is not supported, in other words, the messages will not be encrypted or decrypted at GKs during transmission.

After receiving the LRQ message, the GKh checks whether the value of the tokenOID of the ClearToken in the LRQ message is "I0", if the value is "I0", it indicates that the calling EPa is capable of supporting the ANNEX I of the H.235 V.3. If the GKh also supports the ANNEX I of H.235 V.3, the GKh inquire about that the called EPb is capable of supporting the ANNEX I of the H.235 V.3 and obtains the address of the called EPb based on the information of the called EPb in the LRQ message.

Then the GKh generates a random number "challenge" as well as a session key Kab for the transmission between the EPa and the EPb. The GKh generates an EKgh from a shared key Kgh between the GKh and the GKg and the random number "challenge" using a designated key derivation algorithm, and encrypts the session key Kab with the EKgh to generate an EKab1. Then the GKh sets the EKab1 and the parameters used in the encryption, such as the random number "challenge", to a corresponding sub-field of an independent field ClearToken.h235Key.secureSharedSecret.

When there is an endpointIdentifier field in the LRQ message, the GKh also needs to set the EKab1 to a ClearToken.h235Key.secureSharedSecret.generalID field, and set the key derivation algorithm designated for the key generation to a ClearToken.h235Key.secureSharedSecret.keyDerivationOID field, set the random number "challenge" used for the key generation to a ClearToken.challenge field. At the same time, the GKh sets a ClearToken.generalID to be the ID of the GKg, and sets a ClearToken.senderID to be the ID of the GKh, and finally sets the value of tokenOID field in the ClearToken to be "I3". The ClearToken will be hereinafter referred to as CTg.

The GKh generates the key EKbh from another random number "challenge" and the shared key Kgh between the GKh and the GKg using the designated key derivation algorithm, then encrypts the session key Kab with the EKbh to obtain an EKab2. After that the GKh sets EKab2 and parameters used in the encryption, such as the designated key derivation algorithm and the second random number "challenge", to the h235Key.secureSharedSecret field of another ClearToken.

When there is an endpointIdentifier field in the LRQ message, the GKh also needs to set the EKab2 to the ClearToken.h235Key.secureSharedSecret.generalID field and set the second random number "challenge" used for the key generation to the ClearToken.challenge field. And the GKh also sets the ClearToken.generalID field to be the ID of the called EPb, sets the ClearToken.senderID field to be the ID of the GKh, and finally sets the value of tokenOID field in the ClearToken to "I2". This ClearToken will be hereinafter referred to as CTb.

After the above configurations, the GKh sends a Location Confirm (LCF) message carrying the CTb and the CTg to the GKg.

After receiving the LCF message from the GKh, the GKg extracts the separate ClearToken information, i.e. the two ClearTokens, from the LCF message. The value of the tokenOID of one of the ClearTokens is "I3", indicating that the ClearToken is the CTg; and the value of the tokenOID of the other ClearToken is "I2", indicating that the ClearToken is the CTb. It is indicated that both the called EPb and the GKh are capable of supporting the ANNEX I of the H.235 V.3 and adopt the H.235 V.3 in security plan.

The GKg generates an Admission Confirm (ACF) message and creates a ClearToken in the ACF message. The value of the tokenOID of the ClearToken is set to "I1". Then the GKg selects a third random number "challenge" and sets it to the CTa.challenge field, and obtains the parameters that the CTg used in the encryption, such as the random number "challenge" and the designated key derivation algorithm, so as to derive a key Ekgh from the shared key Kgh between the GKg and the called EPb using the key derivation algorithm designated by the random number "challenge", then decrypt the Ekab1 in the CTg.h235Key.secureSharedSecret field of the LCF message with the key Ekgh, and thereby obtaining the session key Kab. The GKg then generates a key EKag with the third random number "challenge" in the CTa.challenge field and a shared key Kag between the calling EPa and the GKg using a designated key derivation algorithm. After that the GKg encrypts the session key Kab with the key EKag, and sets the encrypted data and the parameters used in the encryption, such as the third random number "challenge" and the designated encryption derivation algorithm, to corresponding sub-fields of the CTa.h235Key.secureSharedSecret. The encrypted result of encrypting the Kab with the Ekag and the parameters used in the encryption will be referred to as CTa hereinafter. Finally the GKg copies the CTb.generalID field into the CTa.h235Key.secureSharedSecret.generalID field, copies the CTb into the ACF message, and sends the ACF message carrying the CTb and the CTa to the calling EPa.

After receiving the ACF message, the calling EPa extracts the CTa and the CTb, and decrypts the encrypted data in the CTa with the key Ekag derived from the shared key Kag between the calling EPa and the GKg and through the designated encryption derivation algorithm and the third random number "challenge" in the CTa, so as to obtain the session key Kab.

After obtaining the session key Kab, the calling EPa establishes a Setup request with the session key and copies the CTb in the ACF message into the Setup request, then the calling EPa sets authentication information which is described in the ANNEX D of H.235 V.3 in the Setup request with the session key Kab and sends the Setup request via direct route to the called EPb.

After receiving the Setup request, the called EPb extracts the CTb and deduces the key EKbh based on the CTb.generalID, the CTb.sendersID and the CTb.challenge in the CTb and the shared key Kbh between the called EPb and the GKh. Then the called EPb decrypts the EKab2 in the CTb.h235Key.secureSharedSecret field of the CTb to obtain the session key Kab.

After obtaining the session key Kab, the called EPb authenticates the authentication information in the Setup request, if the authentication succeeds, process the Q.931 message transmission.

In the method described above, the inventor of the present invention found that the solution of method 1 may have the following disadvantages: the session key Kab between the calling EPa and the called EPb is encrypted and decrypted at the GK of every hop, therefore when there are a large number of GKs between the calling EPa and the called EPb, the time delay in the RAS message transmission will increase and since the session key Kab is exposed at the GK of every hop, the information security is poorly maintained.

Method 2: the GKg and the GKh perform a Diffie-Hellman (DH) key exchange to generate a session key Kab, which is used for authentication in the direct transmission of the Q.931 messages in the H.225 between the calling EPa and the called EPb.

A detailed description of this method is given below: As showed in FIG. 1, the calling EPa sends an ARQ message to the GKg, in which there is a separate ClearToken with a tokenOID set to "I0". The calling EPa generates a public key for a DH negotiation and sets the public key to ClearToken.dhkey field before send the ARQ message.

The GKg, which is capable of supporting the ANNEX I of the H.235 V.3, receives the ARQ message and determines that the called EPb is not in the zone of the GKg based on the information of the called EPb in the ARQ message. Then the GKg sends an LRQ message to the GKh, in which there are a separate ClearToken with a tokenOID set to "I0" and a ClearToken.dhkey field which is identical with the ClearToken.dhkey field in the ARQ message, the ClearToken.dhkey field includes the DH public key generated by the calling EPa for the DH negotiation.

When there are other GKs between the GKg and the GKh, these intermediate GKs duplicate the LRQ message after receiving the LRQ message and send the duplicated LRQ message to an upper layer GK until the duplicated LRQ message reaches the GKh.

After receiving the LRQ message, the GKh determines that both the calling EPa and the called EPb support the ANNEX I of the H.235 V.3 based on the ClearToken.tokenOID field and the information of the called EPb in the LRQ message. Then the GKh creates a ClearToken with a tokenOID set to "I2". The ClearToken is referred to as CTb hereinafter.

The GKh generates a private key for the DH negotiation, and further calculates out a session key Kab from the public key just generated and the public key in the received LRQ message using the DH algorithm for the direct transmission of Q.931 messages between the calling EPa and the called EPb.

The GKh then generates a random number "challenge" and sets it to the CTb.challenge field. After that the GKh deduces a key EKbh and a key KSbh through the designated key derivation algorithm on the basis of the random number "challenge" and the shared key Kbh between the called EPb and the GKh. The GKh generates a random initialization vector IV and sets it to the CTb.h235Key.securityShared-Secret.paramS.IV field. The GKh encrypts the session key Kab with the key EKbh, the key KSbh and the initialization vector IV to obtain an ENCEKbh, KSbh, IV(Kab), and sets the ENCEKbh, KSbh, IV(Kab) to the CTb.h235Key.securitySharedSecret.encryptedSessionKey field. Such method for encrypting the session key Kab is described in the ANNEX I of H.235 V.3.

The GKh sends an LCF message including the private key and the CTb generated by the GKh to the GKg.

The GKg receives the LCF message from the GKh, obtains the CTb and the private key generated by the GKh, copies the CTb and the private key into an ACF message, and sends the ACF message to the calling EPa.

After receiving the ACF message, the calling EPa deduces the session key Kab from the private key generated by the GKh in the ACF message and the public key of the calling EPa using the DH algorithm.

After obtaining the session key Kab, the calling EPa creates a Setup request according to the session key Kab and copies the CTb in the ACF message into the Setup request, then the calling EPa configures authentication information which is described in the ANNEX D of the H.235 V.3 in the Setup request according to the session key Kab, and sends the Setup request to the called EPb.

The called EPb receives the Setup request and extracts the CTb. Based on the information in the CTb, which are the random number "challenge", the designated key derivation algorithm and the shared key Kbh between the called EPb and the GKh, The called EPb deduces the key EKbh and the key KSbh, then decrypts the ENCEKbh, KSbh, IV(Kab) in the CTb.h235Key.secureSharedSecret.encryptedSessionKey field with the EKbh, the KSbh and the initialization vector IV in the CTb to obtain the session key Kab. Finally the EPb authenticates the Setup request with the session key Kab.

Although the second method described above overcomes the time delay in the RAS message transmission and the security problem generated by the exposure of session key Kab at GK of every hop, the inventor of the present invention found that the solution of the method 2 may have the following disadvantages: the method requires that the calling EPa and all the GKs between the calling EPa and the called EPb support the DH negotiation, which limits its application.

Although this method has solved the problem of the increased RAS message transmission delay, and the poor security performance of the session key Kab incurred by being exposed when passing through the GK of each hop. However, the method needs both the calling EPa and the GKs between the calling EPa and the called EPb to support the DH negotiation process, which limits the application of the method.

In summary, the caller's GK and the callee's GK can not select the method for distributing the session key for the calling and the callees, which makes the session key distributing methods lack of flexibility.

SUMMARY OF THE INVENTION

Embodiments of the present invention provides a method and a system for distributing a session key across GateKeeper (GK) zones in a direct-routing mode, which make it possible for a GK of an EndPoint (EP) to select a session key distribution mode, so as to improve flexibility of the GK when distributing the session key.

According to some embodiments of the present invention, the method for distributing a session key across GK zones in the direct-routing mode includes the following steps:

a caller carrying session key distribution modes supported by the caller in an Admission Request (ARQ) message, and sending the ARQ message to a caller's GK;

the caller's GK determining a session key distribution mode of the caller according to the session key distribution modes supported by the caller carried in the ARQ message, carrying the determined session key distribution mode of the caller in a Location Request (LRQ) message, and sending the LRQ message to a callee's GK;

the callee's GK determining a session key distribution mode of the callee according to the information carried in the LRQ message, generating a session key between the caller and the callee, and sending a Location Confirm (LCF) message containing the session key distribution mode of the callee and the generated session key to the caller's GK;

the caller's GK determining a session key between the caller and the callee according to the information carried in the LCF message and the session key distribution modes supported by the caller, sending a call Admission Confirm (ACF) message containing the determined session key to the caller;

the caller sending a Setup message containing the session key to the callee.

From the above scheme, it is clear that, through setting session key distribution modes open to selection at the caller's GK and the callee's GK, some embodiments of the present invention makes it flexible for the caller's GK and the callee's GK to select a session key between the caller and the callee according to practical network situations. When both the caller and the callee do not support a DH negotiation, some embodiments of the present invention can implement the distribution of the session key between the caller's GK and the callee's GK, which provides a new end-to-end security service for the caller and callee, and improves security of the session key. Therefore, the technical scheme of embodiments of the present invention may improve the flexibility of the caller's GK and the callee's GK in distributing session keys, and balance security level with delay of message transmission.

DETAILED DESCRIPTION OF THE PREFERRED EMBODIMENTS

The present invention will be described in detail hereinafter with reference to the accompanying drawing and embodiments.

In order to enable a caller's GK and a callee's GK to select a session key distribution mode, the caller's GK and the callee's GK in the embodiment of the present invention determine the session key distribution mode according to information carried in the received message and pre-configured rules for selecting the session key distribution mode, and then distribute the session key for the caller and the callee.

The method will be described in detail hereinafter.

The method is applicable to direct-routing mode across GK zones in an H.323 system, in other words, applicable to a situation in which the caller and the callee belong to different GKs and the direct information exchange between the caller and the callee is performed in an insecure network, such as an Internet Protocol (IP) network.

The premise of the implementation is that a GK authenticates all the RAS messages of the EPs in its zone during the distribution of the session key; the EPs authenticate the RAS messages of the caller's GK and the callee's GK so as to maintain a mutual trust between EPs and the caller's GK and the callee's GK; and the interlinked GKs authenticate each other to avoid hostile attacks and maintain a mutual trust among them. The above authentication processes may guarantee the security of the RAS messages between the network entities in the H.323 system.

Firstly, rules for the GK to select the session key distribution mode need to be configured. Wherein, the rules can be configured statically, dynamically or by other modes in the GK.

The pre-configured rules can be divided into caller pre-configured rules and callee pre-configured rules according to the location of the GK. The contents of pre-configured rules can be set according to requirements of the practical networks. For example, the caller pre-configured rules can include any one or any combination of the following items: available computing resources at the GK, session key distribution modes supported by the caller and security level of the caller, etc. The callee pre-configured rules can include any one or any combination of the following items: available computing resources at the GK, session key distribution modes of the caller and security level of the callee, etc.

After the above configurations, the caller's GK and the callee's GK can flexibly select the session key distribution modes according to diversified factors.

The process of the caller's GK and the callee's GK selecting the session key distribution modes will be described in detail with reference to following three kinds of processes.

The three kinds of session key distribution processes are:

Direct Routed Call (DRC) I: the session key distribution modes of both the caller and the callee are the callee's GK generating the session key.

DRC II: the session key distribution mode of the caller is a DH negotiation between the caller's GK and the callee's GK, and the session key distribution mode of the callee is a DH negotiation.

DRC III: the session key distribution mode of the caller is a DH negotiation between the caller and callee's GK, and the session key distribution mode of the callee is a DH negotiation.

The EP can indicate whether it supports the ANNEX I of the H.235 V.3 to its home GK during GK discovery or EP registration processes, i.e., indicate whether it supports the method of the present embodiment. For example, the EP may contain a separate ClearToken in a Gatekeeper Request (GRQ) message or a Registration Request (RRQ) message, and set a tokenOID field in the ClearToken to be "I0". When the home GK of the EP receives the GRQ message or the RRQ message, it recognizes the value of the tokenOID field in Clear Token being "I0", and returns a Gatekeeper Confirm (GCF) message or a Registration Confirm (RCF) message to accept the EP. Wherein, the GCF message or the RCF message carries a ClearToken which is identical with that in the GRQ message or the RRQ message.

When the caller does not support the DH negotiation, the caller's GK can respectively select the DRCI and the DRCII processes to distribute the session key between the caller and the callee based on the caller pre-configured rules. Similarly, the callee's GK can select the DRCI and the DRCII processes to distribute the session key between the caller and the callee.

When the caller supports the DH negotiation, the caller's GK can respectively select the DRC I and the DRC III processes to distribute the session key between the caller and the callee. Similarly, the callee's GK can select the DRC I and the DRC III processes to distribute the session key between the caller and the callee.

The process of the caller's GK and the callee's GK distributing the session key between the caller and the callee through the DRC I, DRC II and DRC III processes will be described in detail hereinafter with reference to FIG. 1.

Figure 2:
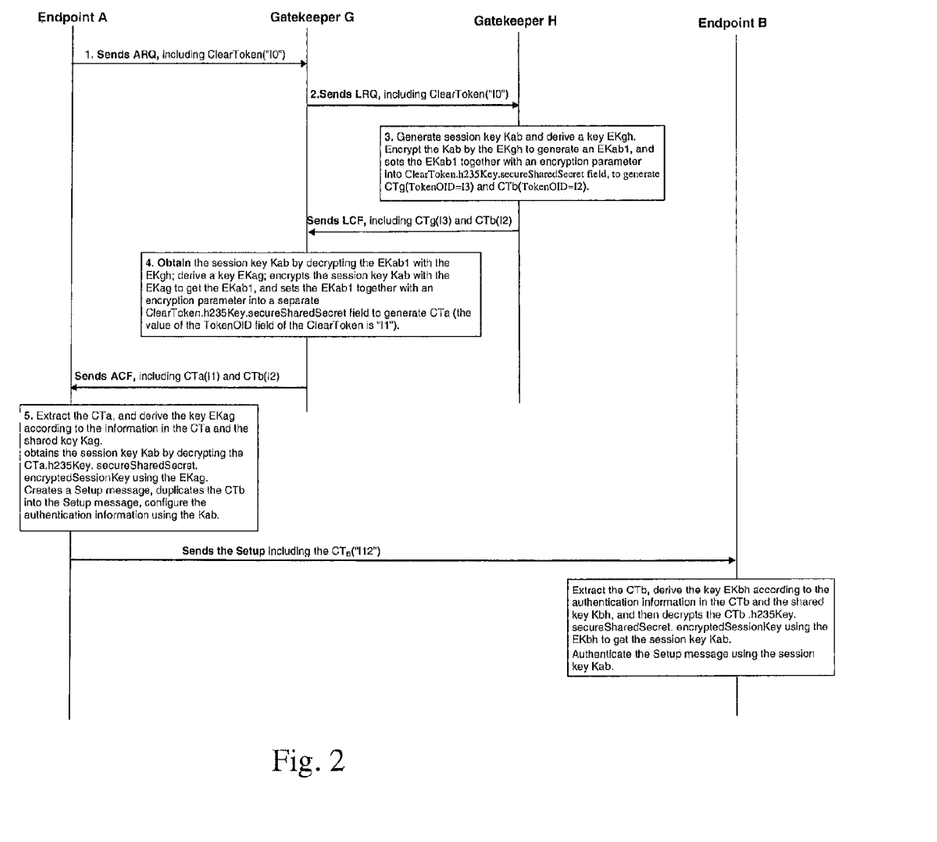
FIG. 2 is a block diagram illustrating the session key distribution processes of DRC I according to one embodiment of the present invention.

Step 1 of the DRCI process, before calling the called EPb in the direct-routing mode, the calling EPa sends an ARQ message to the GKg. Wherein, the message contains a separate ClearToken, and the TokenOID field of the ClearToken is set as "I0", which means the calling EPa does not support the DH negotiation, other fields of the ClearToken remain unused.

Step 2 of the DRCI process, the GKg receives the ARQ message, and determines that the called EPb does not belong to itself according to information of the called EPb carried in the ARQ message. The GKg initiates an LRQ message to inquire about the address of the GKh.

The GKg generates an LRQ message. When the value of the TokenOID of the ClearToken carried in ARQ message is "I0" and the session key distribution mode of the caller is the callee's GK generating the session key, a ClearToken is contained in the LRQ message, and the tokenOID of the ClearToken is set to "I0", indicating that the session key distribution mode of the caller is the callee's GK generating the session key, and other fields of the ClearToken remain unused. After the configurations, the GKg sends the LRQ message to the GKh.

Step 3 of DRCI process, after receiving the LRQ message, the GKh obtains the TokenOID field of the ClearToken in the message and confirms the value is "I0", and selects the session key distribution mode of the callee's GK generating the session key according to the callee pre-configured rules, then the GKh generates a session key Kab using a random number. In order to encrypt the session key Kab, firstly, the GKh generates a random number "challenge", and derives a key EKgh using a shared key Kgh between the GKh and the GKg together with the random number "challenge" by a designated key deriving algorithm. And then, the GKh encrypts the Kab by the EKgh to generate an EKab1, and sets the EKab1 together with an encryption parameter, such as an encryption algorithm and an initialization vector used for encryption, into a separate ClearToken.h235Key.secureSharedSecret field. Wherein, the value of the TokenOID of the ClearToken is "I3", referred to as CTg. At the same time, the GKh generates another ClearToken through a similar process, and the value of the TokenOID of this ClearToken is "I2", referred to as CTb. Finally, the GKh generates an LCF message which carries the CTg and the CTb. The GKh directly transmits the LCF message to the GKg, or transmits the LCF message to an upper GK of the GKh, until the message reaches the GKg.

Step 4 of the DRCI process, after receiving the LCF message, when obtaining the value "I3" of the TokenOID field of the ClearToken in the message, the GKh decrypts the CTg and generates a CTa. The detailed process includes the following steps: firstly, the GKg calculates the key EKgh using the random number "challenge" and a parameter IV in the CTg by the designated key deriving algorithm. And then, the GKg obtains the session key Kab by decrypting the EKab1 with the EKgh. In order to generate the CTa, firstly, the GKg derives a key EKag using the shared key Kag between itself and the calling EPa, the random number "challenge" and the designated key deriving algorithm. And then, the GKg encrypts the session key Kab with the EKag to get the EKab1, and sets the EKab1 together with an encryption parameter, such as the encryption algorithm and the initialization vector used during the encryption, into a separate ClearToken.h235Key.secureSharedSecret field. Wherein, the value of the TokenOID field of the ClearToken is "I1", and the ClearToken is referred to as CTa. Finally, the GKg generates an ACF message, carrying the CTa and the CTb which is duplicated from the LCF message it received.

If there is a lower level GK in the management zone of the GKg, the ACF message should contain the CTa and a CTg which is generated by the lower layer GK through encrypting the Kab using a derived key between the GKg and itself.

After the configurations, the GKg transmits the ACF message to the calling EPa.

Step 5 of the DRCI process, after receiving the ACF message, the calling EPa extracts the CTa from the message, and derives the key EKag according to the information in the CTa and the shared key Kag between the of GKg and itself. And then, the calling EPa obtains the session key Kab by decrypting the CTa.h235Key.secureSharedSecret.encryptedSessionKey using the EKag.

The calling EPa creates a Setup message, duplicates the CTb in the ACF message into the Setup message, and then configures the authentication information of the ANNEX D and ANNEX F of the H235. V3. using the Kab. Then the calling EPa directly transmits the Setup message to the called EPb.

After receiving the Setup message, the called EPb extracts the CTb from the message, derives the key EKbh according to the authentication information in the CTb and the shared key Kbh between itself and the GKh, and then decrypts the CTb. h235Key. secureSharedSecret. encryptedSessionKey using the EKbh to get the session key Kab. At this time, the called EPb can authenticate the Setup message using the session key Kab, if the authentication is passed, the session key Kab is determined to be the session key for the transmission of Q.931 messages between the called EPb and the calling EPa.

Subsequent call processes can be authenticated by the ANNEX D and ANNEX F of the H235. V3.

Figure 3:
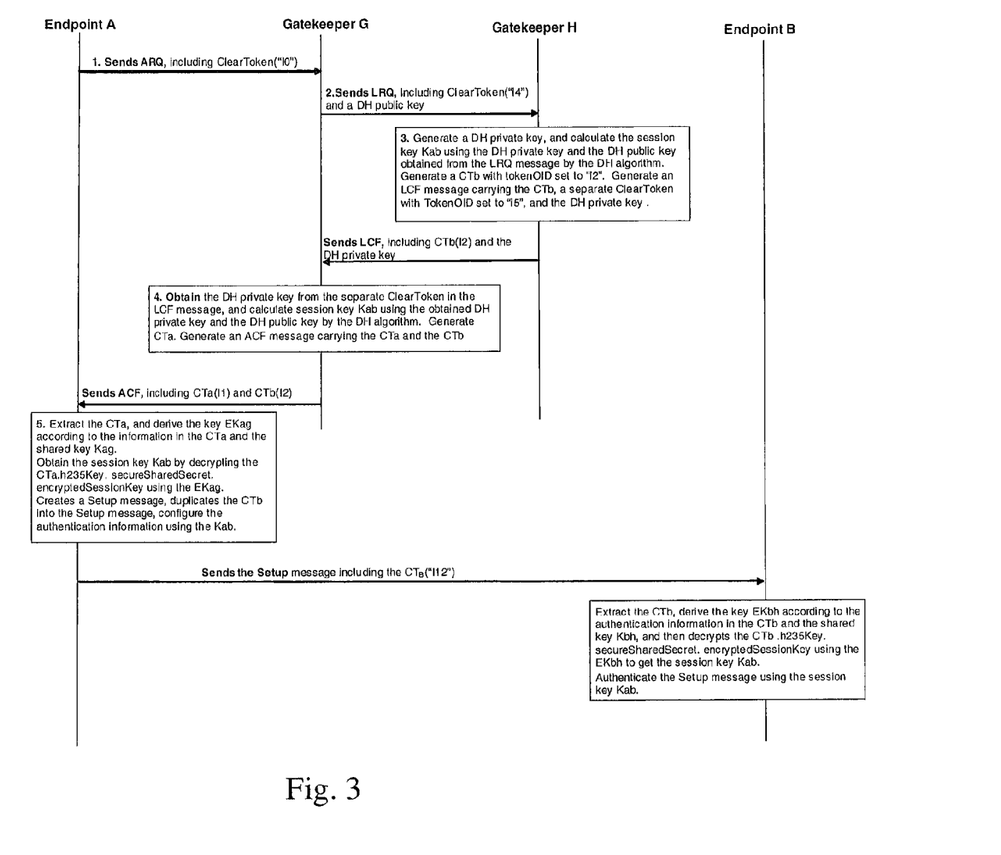
FIG. 3 is a block diagram illustrating the session key distribution processes of DRC II according to one embodiment of the present invention.

Step 1 of the DRCII process, before calling the called EPb in the direct-routing mode, the calling EPa transmits an ARQ message to the GKg, wherein, the message contains a separate ClearToken, and the TokenOID field of the ClearToken is set as "I0", which means the calling EPa does not support the DH negotiation, other fields of the ClearToken remain unused.

Step 2 of the DRCII process, the GKg receives the ARQ message, and determines that the called EPb does not belong to the GKg according to information of the called EPb carried in the ARQ message. The GKg initiates a LRQ message to locate the GKh.

The GKg generates the LRQ message, when it determines that the value of the TokenOID of the ClearToken carried in ARQ message is "I0" and the session key distribution mode of the calling EPa is the caller's GK and the callee's GK generating the session key through the DH negotiation, sets a ClearToken in the LRQ message, the TokenOID filed of the ClearToken is set as "I4", indicating that the session key distribution mode of the calling EPa is the caller's GK and the callee's GK generating the session key through the DK negotiation. The GKg generates a DH public key of itself, and sets the DH public key in the dhkey field of the ClearToken.

After the configurations, the GKg transmits the LRQ message to the GKh.

Step 3 of the DRCII process, after receiving the LRQ message, the GKh confirms that the value of the TokenOID field of the ClearToken in the message is "I4", and confirms that the session key distributing mode of the called EPb is the DH negotiation according to the callee pre-configured rules, then it begins to generate the session key between the calling EPa and the called EPb through the DH negotiation with the GKg. The detailed process includes the following steps: firstly, the GKh generates a DH private key of its own, and calculates the session key Kab using the DH private key of itself and the DH public key obtained from the LRQ message by the DH algorithm. And then, the GKh generates a CTb with tokenOID set to "I2" following the Step 3 of the DRC I process. Finally, the GKh generates an LCF message carrying the CTb, a separate ClearToken with TokenOID set to "I5", and the DH private key generated by its own. Wherein, the value "I5" indicates that the ClearToken contains the DH private key of the callee's GK.

If the session key distribution mode of the called EPb is determined to be the callee's GK generating the session key due to factors such as the GKh not supporting the DH algorithm or security policies, etc., the GKh generates the LCF message following the step 3 of the DRCI process.

After the configurations, the GKh transmits the LCF message to the GKg.

Step 4 of the DRC II process, after receiving the LCF message, the GKg confirms that the value of the tokenOID field of the ClearToken in the message is "I5", and confirms that the calling EPa does not support the DH negotiation, the GKg calculates out the session key and generates a CTa. The detailed process includes the following steps: the GKg obtains the DH public key from the separate ClearToken in the LCF message, and calculates session key Kab using the obtained DH public key and the DH public key generated by itself by the DH algorithm. And then, the GKg generates the CTa following a process similar to the step 4 of the DRCI. Finally, the GKg generates an ACF message carrying the CTa and the CTb which is duplicated from the LCF message.

If the GKg detects that the value of the tokenOID of the ClearToken in the LCF message is "I5", and confirms that the calling EPa supports the DH negotiation, the GKg should generate the ACF message following the step 4 of the DRCIII.

If the GKg detects that the value of the tokenOID of the ClearToken in the LCF message is "I3", it should generate the ACF message following the step 4 of the DRCI.

After the configurations, the GKg transmits the ACF message to the calling EPa.

Step 5 of the DRCII process, after receiving the ACF message, if the calling EPa detects that there is no ClearToken with token OID set to "I5", the calling EPa extracts the CTa from the message, and derives the key EKag according to the information in the CTa and the shared key Kag between the GKg and itself. And then, the calling EPa obtains the session key Kab by decrypting the CTa.h235Key. secureSharedSecret. encryptedSessionKey using the EKag.

If the calling EPa detects that the ACF message contains a ClearToken whose tokenOID is of value "I5", it calculates the session key Kab following the Step 5 of the DRCIII process.

The calling EPa creates a Setup message, duplicates the CTb in the ACF message into the Setup message, and then configures the authentication information of the ANNEX D and ANNEX F of the H235. V3 using the Kab. Then the calling EPa directly transmits the Setup message to the called EPb.

After receiving the Setup message, the called EPb extracts the CTb from the message, derives the key EKbh according to the authentication information in CTb and the shared key Kbh between itself and the GKh, and then decrypts the CTb. h235Key. secureSharedSecret. encryptedSessionKey using the EKbh to get the session key Kab. At this time, the called EPb can authenticate the Setup message using the session key Kab, if the authentication is passed, the session key Kab is determined to be the session key for the transmission of Q.931 messages between the called EPb and the calling EPa.

Subsequent call processes can be authenticated by the ANNEX D and ANNEX F of the H235. V3.

Figure 4:
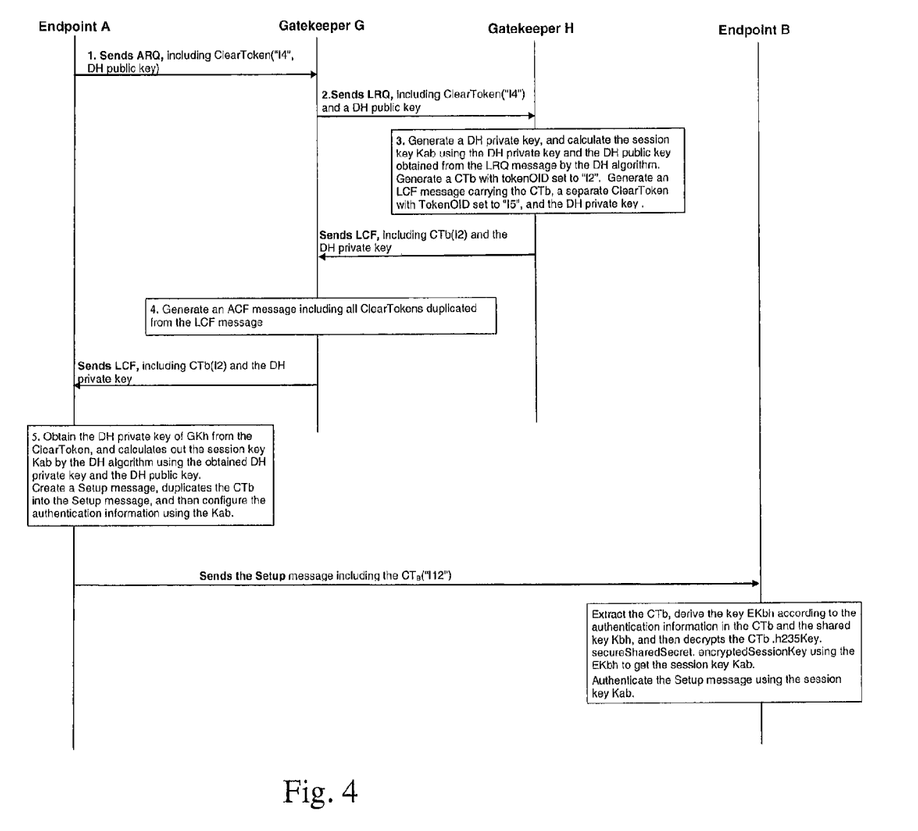
FIG. 4 is a block diagram illustrating the session key distribution processes of DRC III according to one embodiment of the present invention.

Step 1 of the DRCIII process, the calling EPa supports the DH negotiation process. The calling EPa generates a DH public key before calling the called EPb in the direct-routing mode. And the calling EPa sets the generated DH public key in a dhkey field of a separate ClearToken in an ARQ message, wherein, the value of the TokenOID field of the ClearToken is set to be "I4", other fields remain unused.

Step 2 of the DRCIII process, the GKg receives the ARQ message, and determines that the called EPb does not belong to itself according to information of the called EPb carried in the ARQ message. The GKg initiates an LRQ message to inquire about the address of the GKh.

The GKg generates an LRQ message, when it determines that the value of the TokenOID of the ClearToken carried in ARQ message is "I4" and the session key distribution mode of the calling EPa is the caller's GK and the callee's GK generating the session key through the DH negotiation, the GKg copies the ClearToken in the ARQ message to the LRQ message, and transmits the LRQ message to the GKh.

Step 3 of the DRCIII process, after receiving the LRQ message, the GKh confirms the message contains a separate ClearToken with TokenOID set to "I4", and confirms that the session key distribution mode of the called EPb is the DH negotiation according to the callee pre-configured rules, then it begins to negotiate a session key between the calling EPa and the called EPb through the DH negotiation with the GKg. The detailed process includes the following steps: firstly, the GKh generates a DH private key of its own, and calculates the session key Kab using the DH private key of itself and the DH public key obtained from the LRQ message by the DH algorithm. And then, the GKh generates a CTb with tokenOID set to "I2" following the Step 3 of the DRC I process. Finally, the GKh generates an LCF message carrying the CTb, a separate ClearToken with TokenOID set to "I5", and the DH private key generated by its own. Wherein, the value "I5" indicates that the ClearToken contains the DH private key of the callee's GK.

If the session key distribution mode of the called EPb is determined to be the callee's GK generating the session key due to factors such as the GKh not supporting the DH algorithm or security policies, etc., the GKh generates the LCF message following the step 3 of the DRCI process.

After the configurations, the GKh transmits the LCF message to the GKg.

Step 4 of the DRC III process, after receiving the LCF message, if the GKg confirms that the LCF message contains the ClearToken with tokenOID set to "I5", and confirms that the DH negotiation is supported by itself, the GKg generates an ACF message. Wherein, the message contains all ClearTokens duplicated from the LCF message. Then the GKg transmits the ACF message to the calling EPa.

If the GKg detects that the value of the tokenOID of the ClearToken in the LCF message is "I3", and confirms that the calling EPa does not support the DH negotiation, the GKg should generate the ACF message following the step 4 of the DRCI.

Step 5 of the DRCIII process, after receiving the ACF message, if the calling EPa confirms that the message contains a separate ClearToken with tokenOID set to "I5", it calculates out the session key. The detailed process includes the following steps: the calling EPa obtains the DH private key of GKh from the ClearToken, and calculates out the session key Kab by the DH algorithm using the obtained DH private key and the DH public key generated by itself.

If the calling EPa detects that the ACF message contains a ClearToken with tokenOID set to "I3", it calculates out the session key Kab following the Step 5 of the DRCI process.

The calling EPa creates a Setup message, duplicates the CTb in the ACF message into the Setup message, and then configures the authentication information of the ANNEX D and ANNEX F of the H235. V3 using the Kab in the Setup message. Then the calling EPa transmits the Setup message to the called EPb directly.

After receiving the Setup message, the called EPb extracts the CTb from the message, derives the key EKbh according to the authentication information in CTb and the shared key Kbh between itself and the GKh, and then decrypts the CTb .h235Key. secureSharedSecret. encryptedSessionKey using the EKbh to get the session key Kab. At this time, the called EPb can authenticate the Setup message using the session key Kab, if the authentication is passed, the session key Kab is determined to be the session key for the transmission of Q.931 messages between the called EPb and the calling EPa.

Subsequent call processes can be authenticated by the ANNEX D and ANNEX F of the H235. V3.

Detailed meanings of the tokenOID are shown in table 1:

TABLE 1

| Object Identifier Reference | Object Identifier Value | Description |
| --- | --- | --- |
| "I0" | {itu-t (0) recommendation (0) h (8) 235 version (0) 3 48} | Used in separate ClearTokens of GRQ/RRQ, GCF/RCF and ARQ, indicating that an EP does not support the DH negotiation. Used in a separate ClearToken of the LRQ, indicating that the ClearToken contains a DH public key of a caller. |
| "I1" | {itu-t (0) recommendation (0) h (8) 235 version (0) 3 49} | Used in separate ClearTokens submitted to the caller, indicating that the ClearToken contains a session key. |
| "I2" | {itu-t (0) recommendation (0) h (8) 235 version (0) 3 50} | Used in separate ClearTokens submitted to the callee, indicating that the ClearToken contains a session key. |
| "I3" | {itu-t (0) recommendation (0) h (8) 235 version (0) 3 51} | Used in a separate ClearToken of the LCF, indicating that the ClearToken contains a session key. |
| "I4" | {itu-t (0) recommendation (0) h (8) 235 version (0) 3 52} | Used in separate ClearTokens of GRQ/RRQ, GCF/RCF and ARQ, indicating that an EP supports the DH process. Used in a separate ClearToken of LRQ, indicating that the ClearToken contains a DH public key of a caller. |
| "I5" | {itu-t (0) recommendation (0) h (8) 235 version (0) 3 53} | Used in separate ClearTokens submitted to a caller, indicating that the ClearToken contains a DH public key of a callee. |

Although the present invention is described with reference to the above-mentioned embodiments, those skilled in the art can know that various changes, modifications and variations can be made without departing from the spirit and the protection scope of the invention and therefore should be protected by the protection scope as set by the accompanying claims of the present invention.

What is claimed is:

1. A method for distributing a session key across Gate-Keeper (GK) zones in a direct-routing mode, comprising:
   receiving, at a caller's GK, an Admission Request (ARQ) message generated by a caller, the ARQ message including information capable of identifying session key distribution modes supported by the caller;
   selecting, by the caller's GK, one of at least three session key distribution modes to use based at least in part on the information in received ARQ message;
   sending, by the caller's GK, a Location Request (LRQ) message to a callee's GK, the LRQ message including information capable of identifying the selected session key distribution mode;
   receiving, at the caller's GK, a Location Confirm (LCF) message, the LCF message including a session key generated by the callee's GK in accordance with the selected session key distribution mode; and
   sending, by the caller's GK, the session key to the caller, the session key operable for use between the caller and the callee.

2. The method according to claim 1, wherein the step of selecting, by the caller's GK, one of at least three session key distribution modes to use based at least in part on the information in received ARQ message comprises: selecting one of at least three session key distribution modes to use according to the session key distribution modes supported by the caller in the ARQ message and caller pre-configured rules which comprise at least one of available resources of the GK, session key distribution modes supported by the caller, and the security level of the caller.

3. The method according to claim 1, further comprising:
   determining, by the callee's GK, the session key distribution mode of the callee according to the information carried in the LRQ message and callee pre-configured rules which comprise at least one of available resources of the callee's GK, session key distribution modes supported by the caller and the security level of the callee.

4. The method according to claim 1, further comprising:
   setting a value "I4" in a tokenOID of a ClearToken in the ARQ message, and sending the ARQ message to the caller's GK if the caller supports a Diffie-Hellman (DH) negotiation;
   setting a value "I0" in the tokenOID of the ClearToken in the ARQ message, if the caller doesn't supports a Diffie-Hellman (DH) negotiation; and
   sending the ARQ message to the caller's GK.

5. The method according to claim 1, wherein the selecting step comprises: selecting the callee's GK generated session.

6. The method according to claim 5, further comprising:
   the callee's GK determining that the session key distribution mode of the callee is the callee's GK generating the session key according to the value "I0" in the tokenOID of the ClearToken in the LRQ message; and
   the callee's GK generating a CTb with tokenOID set to "I2", and a CTg with tokenOID set to "I3", sending the LCF message containing the CTb and the CTg to the caller's GK.

7. The method according to claim 6, further comprising:
   the caller's GK obtaining and judging the session key distribution mode of the callee carried in the LCF message, and determining that the session key distribution mode of the callee is the callee's GK generating the session key, generating a CTa according to the CTg carried in the LCF message, sending the ACF message containing the CTa and the CTb in the LCF message to the caller.

8. The method according to claim 7, further comprising:
   the caller determining that the ACF message does not contain a ClearToken with tokenOID set to "I5"; calculating out a session key between the caller and the callee according to a shared key between the caller's GK and the caller.

9. The method according to claim 8, further comprising:
   the caller configuring authentication information of the Setup message according to the session key, and sending the Setup message carrying the CTb to the callee;
   the callee obtaining the session key according to the CTb in the Setup message, and authenticating the Setup message according to the session key;
   the callee determining the session key as the session key used for sending messages with the caller in the direct-routing mode.

10. The method according to claim 5, wherein the sending step comprises:
    obtaining a DH private key of the callee's GK from a ClearToken in the LCR message;
    obtaining the session key by decrypting an encrypted session key with the shared key between the callee's GK and the caller's GK;
    encrypting the session key with the shared key between the caller' GK and the caller;
    sending an ACF message including the CTa and a CTb from the LCR message to the caller.

11. The method according to claim 10, further comprising:
    deriving a key according to the information in the CTa and the shared key between the caller and the caller's GK;
    obtaining the session key by decrypting information in the CTa using the derived key;
    generating a setup message including the CTb and authentication information using the session key.

12. The method according to claim 1, wherein the selecting step comprises: selecting DH negotiation between the caller's GK and the callee's GK as the session key distribution mode.

13. The method according to claim 12, further comprising:
    the callee's GK determining that the session key distribution mode of the callee is the DH negotiation according to the value "I4" in the tokenOID of the ClearToken in the LRQ message;
    the callee's GK generating a DH private key and calculating the session key from the generated DH private key together with the DH public key obtained from the LRQ message using a DH algorithm; and
    generating a CTb with tokenOID set to "I2", and a ClearToken with tokenOID set to "I5" and the dhkey field of the ClearToken containing a DH private key generated by the callee's GK, and sending the LCF message containing the CTb and the ClearToken to the caller's GK.

14. The method according to claim 13, further comprising:
    the caller's GK obtaining and judging the session key distribution mode of the callee carried in the LCF message, and determining that the session key distribution mode of the callee is the DH negotiation and the caller does not support the DH negotiation, calculating out a session key from the DH public key of the caller's GK and the DH private key of the callee's GK carried in the LCF message using the DH algorithm, generating a CTa, and sending the ACF message containing the CTa together with the CTb in the LCF message to the caller.

15. The method according to claim 14, further comprising:
the caller determining that the ACF message contains a ClearToken with tokenOID set to "I5", calculating out a session key between the caller and the callee according to the DH public key of the caller and the DH private key of the callee's GK carried in the ACF message.

16. The method according to claim 15, further comprising:
the caller configuring authentication information of the Setup message according to session key, and transmitting the Setup message carrying the CTb to the callee;
the callee obtaining the session key according to the CTb in the Setup message, and authenticating the Setup message according to the session key;
the callee determining the session key as the session key used for sending messages with the caller in the direct-routing mode.

17. The method according to claim 12, wherein the sending step comprises:
obtaining a DH private key of the callee's GK from a ClearToken in the LCR message;
calculating the session key by DH algorithm using the DH private key and a DH public key of the caller's GK;
generating a CTa by using the session key;
sending an ACF message including the CTa and a CTb from the LCR message to the caller.

18. The method according to claim 17, further comprising:
deriving a key according to the information in the CTa and the shared key between the caller and the caller's GK;
obtaining the session key by decrypting information in the CTa using the derived key;
generating a setup message including the CTb and authentication information using the session key.

19. The method according to claim 1, wherein the selecting step comprises: selecting DH negotiation between the caller and the callee's GK as the session key distribution mode.

20. The method according to claim 19, further comprising:
the callee's GK determining that the session key distribution mode of the callee is the DH negotiation according to the value "I4" in the tokenOID of the ClearToken in the LRQ message;
the callee's GK generating a DH private key and calculating the session key from the generated DH private key together with the DH public key obtained from the LRQ message using a DH algorithm; and
generating a CTb with tokenOID set to "I2", and a ClearToken with tokenOID set to "I5" and the dhkey field of the ClearToken containing a DH private key generated by the callee's GK, and sending the LCF message containing the CTb and the ClearToken to the caller's GK.

21. The method according to claim 20, further comprising:
the caller's GK obtaining and judging the session key distribution mode of the callee carried in the LCF message, and determining that the session key distribution mode of the callee is the DH negotiation and the caller supports the DH negotiation, obtaining the ClearToken in the LCF message, and sending the ACF message carrying the ClearToken to the caller.

22. The method according to claim 21, further comprising:
the caller determining that the ACF message contains a ClearToken with tokenOID set to "I5", calculating out a session key between the caller and the callee according to the DH public key of the caller and the DH private key of the callee's GK carried in the ACF message.

23. The method according to claim 19, wherein the sending step comprises:

sending an ACF message including the CTb and a DH private key of the callee's GK which are from the LCR message to the caller.

24. The method according to claim 23, further comprising:
obtaining the DH private key of the callee's GK from a ClearToken in the LCR message;
calculating the session key by DH algorithm using the DH private key and a DH public key of the caller's;
generating a setup message including the CTb and authentication information using the session key.

25. The method according to claim 1, further comprising:
before the caller sending the ARQ message to the caller's GK, the caller and the callee carrying information of whether they support DH negotiation in the ClearToken of a Gatekeeper Request (GRQ) message or a Registration Request (RRQ) message, and sending the message to the caller's GK and the callee's GK, respectively.

26. A system for distributing a session key across Gate-Keeper (GK) zones in a direct-routing mode, comprising:
a caller, a callee, a call's GK and a callee's GK; wherein
the caller is configured to carry session key distribution modes supported by the caller in an Admission Request (ARQ) message and send the ARQ message to the caller's GK;
the caller's GK is configured to select one of at least three session key distribution modes to use based at least in part on the information in received ARQ message and send a Location Request (LRQ) message to the callee's GK, the LRQ message including information capable of identifying the selected session key distribution mode;
the callee's GK is configured to generate a session key between the caller and the callee in accordance with the selected session key distribution mode, and send a Location Confirm (LCF) message containing the generated session key to the caller's GK;
the caller's GK is further configured to determine the session key according to the information carried in the LCF message and the session key distribution modes supported by the caller, send a call Admission Confirm (ACF) message containing the determined session key to the caller;
the caller is further configured to send a Setup message containing the session key to the callee.

27. A system for distributing a session key across Gate-Keeper (GK) zones in a direct-routing mode, comprising:
a caller's gatekeeper (GK) communicating with a callee's GK and a caller within the first GK, to distribute a session key for use between the caller and the callee within the callee's GK; wherein the caller's GK is capable of:
receiving an Admission Request (ARQ) message generated by the caller, the ARQ message including information capable of identifying session key distribution modes supported by the caller;
selecting one of at least three session key distribution modes to use based at least in part on the information in the received ARQ message;
sending a Location Request (LRQ) message to a callee's GK, the LRQ message including information capable of identifying the selected session key distribution mode;
receiving, at the caller's GK, a Location Confirm (LCF) message, the LCR message including a session key generated by the callee's GK in accordance with the selected session key distribution mode; and
sending the session key to the caller.

28. The system according to claim 27, wherein the caller is further capable of: setting a value "I4" in a tokenOID of a ClearToken in the ARQ message, and sending the ARQ message to the caller's GK if the caller supports a Diffie-Hellman (DH) negotiation;

setting a value "I0" in the tokenOID of the ClearToken in the ARQ message, if the caller doesn't supports a Diffie-Hellman (DH) negotiation; and sending the ARQ message to the caller's GK.

29. The system according to claim 27, wherein the selecting step comprises: selecting the callee's GK generating the session key as the distribution modes to use;

the sending process comprises:

obtaining a DH private key of the callee's GK from a ClearToken in the LCR message;

obtaining the session key by decrypting an encrypted session key with the shared key between the callee's GK and the caller's GK;

encrypting the session key with the shared key between the caller' GK and the caller;

sending an ACF message including the CTa and a CTb from the LCR message to the caller.

30. The system according to claim 27, wherein the selecting process comprises: selecting the caller's GK and the callee's GK performing the DH negotiation as the distribution modes to use;

the sending step comprises:

obtaining a DH private key of the callee's GK from a ClearToken in the LCR message;

calculating the session key by DH algorithm using the DH private key and a DH public key of the caller's GK;

generating a CTa by using the session key;

sending an ACF message including the CTa and a CTb from the LCR message to the caller.

31. The system according to claim 27, wherein the selecting step comprises: selecting the caller and the callee's GK performing the DH negotiation as the distribution modes to use;

the sending step comprises:

sending an ACF message including the CTb and a DH private key of the callee's GK which are from the LCR message to the caller.

* * * * *